United States Patent
Trim et al.

(10) Patent No.: US 11,314,621 B2
(45) Date of Patent: Apr. 26, 2022

(54) SOFTWARE APPLICATION VALIDATION

(71) Applicant: INTERNATIONAL BUSINESS MACHINES CORPORATION, Armonk, NY (US)

(72) Inventors: Craig M. Trim, Ventura, CA (US); Jana H. Jenkins, Raleigh, NC (US); Fang Lu, Billerica, MA (US); Uri Kartoun, Cambridge, MA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 16/440,270

(22) Filed: Jun. 13, 2019

(65) Prior Publication Data
US 2020/0394117 A1   Dec. 17, 2020

(51) Int. Cl.
*G06F 11/36*  (2006.01)
*G06N 20/00*  (2019.01)
*G06F 3/04886*  (2022.01)

(52) U.S. Cl.
CPC ......... *G06F 11/3612* (2013.01); *G06N 20/00* (2019.01); *G06F 3/04886* (2013.01)

(58) Field of Classification Search
CPC .. G06F 11/3612; G06F 3/04886; G06N 20/00
USPC ............................................. 345/173; 715/38
See application file for complete search history.

(56) References Cited

U.S. PATENT DOCUMENTS

| | | | |
|---|---|---|---|
| 7,663,607 B2 * | 2/2010 | Hotelling | G06F 3/044 |
| | | | 345/173 |
| 8,281,041 B2 | 10/2012 | Butterfield | |
| 8,468,167 B2 | 6/2013 | Sathyanarayana | |
| 2006/0184410 A1 | 8/2006 | Ramamurthy | |
| 2011/0078560 A1 * | 3/2011 | Weeldreyer | G06F 3/0488 |
| | | | 715/255 |
| 2011/0214067 A1 | 9/2011 | Tanaka | |
| 2017/0090749 A1 * | 3/2017 | Marsden | G06F 3/04886 |
| 2020/0233500 A1 * | 7/2020 | Mannby | G06F 3/04886 |

FOREIGN PATENT DOCUMENTS

WO       199909504 W       2/1999

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Hope C Sheffield
(74) *Attorney, Agent, or Firm* — Schmeiser, Olsen & Watts; Brian M. Restauro

(57) ABSTRACT

A method and system for validating a software application is provided. The method includes monitoring user interaction patterns of a user with respect to software being executed by an electronic device. Content of the software is scanned, and usage attributes of the software are analyzed. Virtual entry points executed via the user interaction patterns with respect to accessing the software application are validated and associated metadata is generated. In response an error condition associated with the user interaction patterns is detected and an automated corrective action associated with correcting the error condition is executed.

18 Claims, 7 Drawing Sheets

(56) References Cited

OTHER PUBLICATIONS

Microsoft Office Support; Data types in Data Models; https://support.office.com/en-us/article/data-types-in-data-models-e2388f62-6122-4e2b-bcad-053e3da9ba90; retrieved from the Internet Oct. 22, 2018; 10 pages.
Redman, Thomas. "Bad Data Costs the U.S. $3 Trillion Per Year." HBR. https://hbr.org/2016/09/bad-data-costs-the-u-s-3-trillion-per-year; Sep. 22, 2016. Retrieved on Oct. 22, 2018; 3 pages.
Wheeler, Rachel. "Most data quality errors occur at the point of entry." Experian, https://www.edq.com/blog/most-data-quality-errors-occur-at-the-point-of-entry/; Jun. 17, 2010 Retrieved on Oct. 22, 2018; 5 pages.

* cited by examiner

SOFTWARE APPLICATION VALIDATION

BACKGROUND

The present invention relates generally to a method validating software functionality and in particular to a method and associated system for enabling software technology for monitoring software, detecting error conditions associated with operation of the software, and executing an automated corrective action associated with correcting the error condition.

SUMMARY

A first aspect of the invention provides an software application validation method comprising: monitoring, by a processor of an electronic device, user interaction patterns of a user with respect to a software application being executed by the electronic device; continuously scanning, by the processor, content of the software application; analyzing, by the processor, core software usage attributes of the content; validating, by the processor based on results of the analyzing, virtual entry points executed via the user interaction patterns with respect to accessing the software application; generating, by the processor, metadata describing the virtual entry points; detecting, by the processor based on analyzing the metadata, an error condition associated with the user interaction patterns and a current user action implemented with respect to the software application; and executing, by the processor, an automated corrective action associated with correcting the error condition and maintain the software application.

A second aspect of the invention provides a computer program product, comprising a computer readable hardware storage device storing a computer readable program code, the computer readable program code comprising an algorithm that when executed by a processor of an electronic device implements a software application validation method, the method comprising: monitoring, by the processor, user interaction patterns of a user with respect to a software application being executed by the electronic device; continuously scanning, by the processor, content of the software application; analyzing, by the processor, core software usage attributes of the content; validating, by the processor based on results of the analyzing, virtual entry points executed via the user interaction patterns with respect to accessing the software application; generating, by the processor, metadata describing the virtual entry points; detecting, by the processor based on analyzing the metadata, an error condition associated with the user interaction patterns and a current user action implemented with respect to the software application; and executing, by the processor, an automated corrective action associated with correcting the error condition and maintaining the software application.

A third aspect of the invention provides an electronic device comprising a processor coupled to a computer-readable memory unit, the memory unit comprising instructions that when executed by the processor implements a software application validation method comprising: monitoring, by the processor, user interaction patterns of a user with respect to a software application being executed by the electronic device; continuously scanning, by the processor, content of the software application; analyzing, by the processor, core software usage attributes of the content; validating, by the processor based on results of the analyzing, virtual entry points executed via the user interaction patterns with respect to accessing the software application; generating, by the processor, metadata describing the virtual entry points; detecting, by the processor based on analyzing the metadata, an error condition associated with the user interaction patterns and a current user action implemented with respect to the software application; and executing, by the processor, an automated corrective action associated with correcting the error condition and maintaining the software application.

The present invention advantageously provides a simple method and associated system capable of accurately monitoring software functionality.

DETAILED DESCRIPTION

Figure 1:
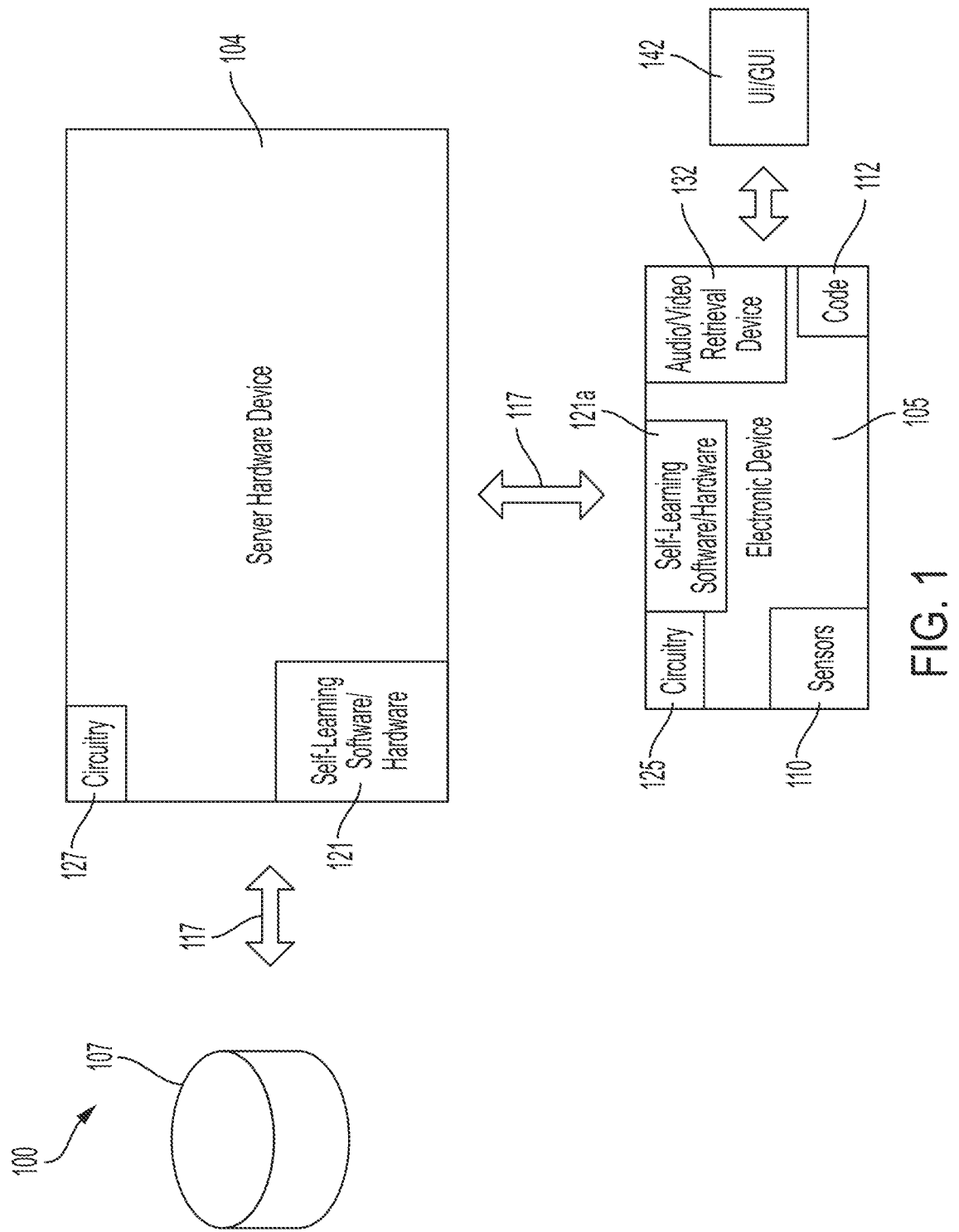
FIG. 1 illustrates a system for improving software technology associated with monitoring software, detecting error conditions associated with operation of the software, and executing an automated corrective action associated with correcting the error condition, in accordance with embodiments of the present invention.

FIG. 1 illustrates a system 100 for improving software technology associated with monitoring software, detecting error conditions associated with operation of the software, and executing an automated corrective action associated with correcting the error condition, in accordance with embodiments of the present invention. A typical software system may include data errors at a point of entry. Likewise, a sheer variety of new information available from external sources is associated with software analysis lag times. Software system solutions may address missing or inaccurate information for entry. Additionally, data entry and data transfer personnel may enable software entry mistakes. For example, a user place data within an incorrect data entry field of an interface. Therefore, is a critical need to address software-based data quality issues to improve a functionality of a variety of software applications.

System 100 is configured to improve a software validation process by analyzing user interaction patterns with software.

For example, a user mouse clicking pattern within table columns, interface keys that are accessed on a keyboard, comparing an expected data type in each field in a digital file (e.g., number keys vs. letter keys), etc.

System 100 enables the following software implemented functionality:

1. Validating data entry points (within software and associated data) based on a user interaction pattern with respect to the software and associated data. A user interaction pattern may include, inter alia, actions that denote selections, keystroke entries, an expected data type in created files, etc. Validating the data entry points may include: identifying data creation patterns of the user based on a historical analysis of previous data creation and editing actions of the user; and identifying data entries as potentially incorrect data points based on the identified data creation patterns and crowd sourced information. In response to detecting a potential error with respect to the validated entry point, it may be determined if a difference between the user interaction pattern and a user's current action (that resulted in the potential error) exceeds a threshold amount. Subsequently, a corrective action may be generated. Likewise, usage area patterns for a specific software application are identified by fetching: rules, data variations based on previously logged data, and associated attributes of the previously logged data. Resulting contextual situations are identified based on a user's reaction to an error notification.

System 100 of FIG. 1 includes a server hardware device 104 (i.e., specialized hardware device), an electronic device 105 (including a UI/GUI 142), and a database 107 (e.g., a cloud-based system) interconnected through a network 117. Server hardware device 104 includes specialized circuitry 127 (that may include specialized software) and self-learning software code/hardware structure 121 (i.e., including self-learning software code). Electronic device 105 may include personal devices provided to a user. Electronic device may be Bluetooth enabled to provide connectivity to any type of system. Electronic device 105 includes self-learning software code/hardware structure 121a (e.g., integrated with self-learning software code/hardware structure 121), specialized circuitry 125 (that may include specialized software), audio/video retrieval device 132, sensors 110, and code 112 (including configuration code and generated self-learning software code for transfer to/from server hardware device 104). Sensors 110 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Server hardware device 104, electronic device 105, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, electronic device 105, and database 107 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with monitoring software, detecting error conditions associated with operation of the software, and executing an automated corrective action associated with correcting the error condition. Audio/video retrieval device 132 may comprise any type of audio/video device including, inter alia, a camera with gaze point tracking hardware and software, a video camera, a still shot camera, etc. Gaze point tracking comprises a process for tracking motion of an eye by measuring either the point of gaze (i.e., a direction that a user is viewing). Gaze point tracking hardware comprises a device for measuring eye positions and eye movement. Network 117 may include any type of network including, inter alia, a local area network, (LAN), a wide area network (WAN), the Internet, a wireless network, etc. Alternatively, network 117 may include an application programming interface (API).

The following steps associated with system 100 describe implementation processes for improving software technology associated with monitoring software, detecting error conditions associated with operation of the software, and executing an automated corrective action associated with correcting the error condition:

1. A user interaction with a software application running on the user's computer is monitored.
2. Content of the software application is scanned.
3. Core usage and intent of data included in the content is analyzed.
4. A correct data type associated with data that should be entered in each field (of a document of the software application) is analyzed based on intended core usage of the document, document titles, table column headers, etc.
5. User interaction with a user interface (e.g., a keyboard) is monitored and associated that with corresponding data in the document, document titles, table column headers, etc. For example, it may be determined if the user had to drag a table column header or double click on the table column header to expand a column width to view complete data.
6. A general expected data of a column is determined based on column header information. For example, if a column header indicates an age should be entered in the column, then a width of the data should only be between 1-3 units. If the user has to expand the column width due to data length exceeding 3 units, then system 100 may suggest that there are errors in the data. With respect to an additional example, if a column header includes a "Last name" and the user clicks "Delete", "backspace", or engages "letter" keys to keep replacing existing data, then system 100 may suggest that original data is incorrect. A further example with respect to a column name being associated with a lab name (e.g., lab A) may indicate that instead of having values in in a column within an expected range of lab A (approximately 0.5-1.2 mg/dL), the values are associated with a different range (e.g., of Sodium; 135-145 mEq/L). The detected discrepancy may indicate that the column name is incorrect.
7. System 100 determines which portion of a keyboard the user interacts with and an associated frequency of the interaction when the user enters data. Subsequently, system 100 may generate a heat map to reflect user interaction patterns, as described with respect to FIG. 4, infra.
8. System verifies an expected data type in a document with respect to the user's keyboard interaction pattern. For example, if an expected data type should include numbers but the user has been using the letter keys when working in those data fields, then system 100 may suggest data entry issue and may trigger an alert to notify the user to double check the data entry for validation purposes.

System 100 executes a process for determining a data pattern recognition specific to a unique user as follows:

System 100 analyzes data creation patterns of a data author or editor based on his/her data creation or editing experience(s). The analysis may include a style of the data creation. Each data author may be associated with a personal data editing corpus for pattern identification. For example, a system may be enabled in order to understand/monitor a user's data creation and editing process unique to that user's profile. User patterns are saved in a local (or cloud-based location) for future referencing and correlation enhancement.

System 100 executes a process for negative data pattern recognition (e.g., crowdsourced or specific to a unique user) as follows:

System 100 identifies, triggers, and subsequently filters out unsafe (negative) data creation patterns. For example, data creation patterns based on: adding numbers to text fields, misclassification of data, pasting bad data in a wrong type field, etc.

System 100 executes a process for enabling data quality management improvement as follows:

1. System 100 evaluates software usage area (e.g., column/cell/field, etc.) patterns by fetching rules, data variations, etc. based on logging past data and associated attributes for post analysis.
2. System evaluates explicit and implicit feedback to and from data author/editor experience.
3. User reactions (e.g., data correction behavior upon notification) under certain contextual situations is analyzed via an R-CNN algorithm for contextual situation analysis and PCA for dimensionality reduction such that a user's reactions to situations associated with negative quality data created or edited is determined.
4. System 100 analyzes user collected data (of steps 1-3) with respect to step patterns comparisons. The process for collecting user data is executed based on an approval by the user. Such approval also includes a user's option to cancel such collecting, and thus opt/in and opt/out of collecting user data at the user's discretions. Further, any data collected is understood to be intended to be securely stored and unavailable without user authorization.
5. System 100 evaluates a difference in patterns significant enough to cause a drop-in author confidence pertaining to context. Likewise, a PCA analysis is executed for enabling feature pruning or dimensionality reduction to simplify an evaluation of user's incorrect data creation rates and levels during varied intervals of time.
6. System 100 generates recommendations as a set of parameters for adjusting data creation or editing pattern(s) of the data author/editor as needed resulting in adjusted data comparison patterns providing a higher quality data creation/editing experience correlating to a user state/profile.

Therefore, system 100 utilizes an analysis based on the user's interaction with a keyboard mouse and data displayed in a user interface to determine data quality. An alert may be generated to notify the user of potential data entry errors.

Figure 2:
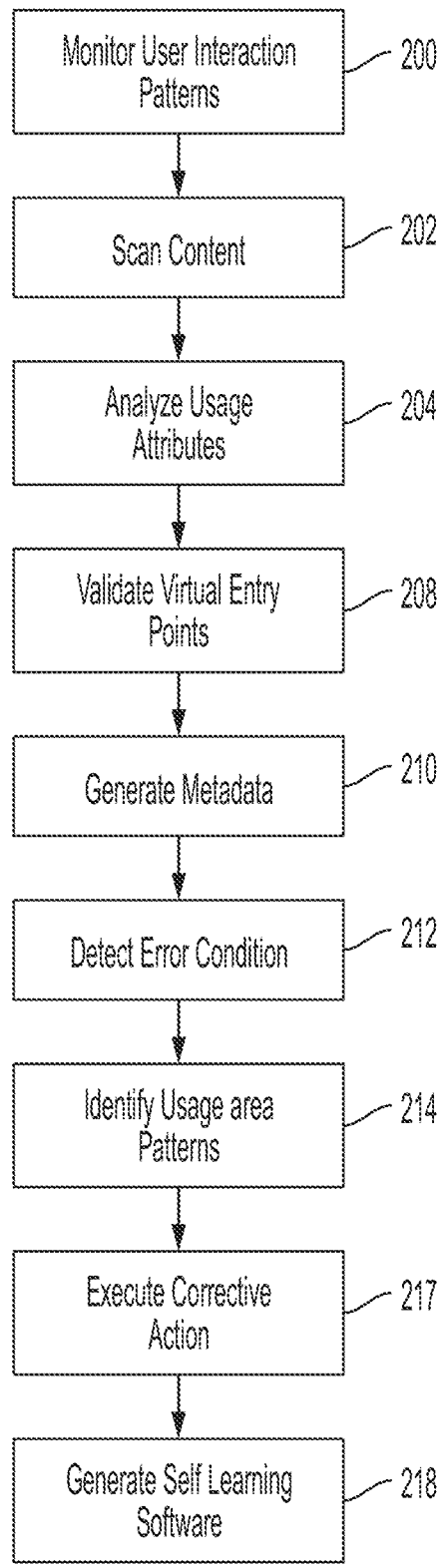
FIG. 2 illustrates an algorithm detailing a process flow enabled by the system of FIG. 1 for improving software technology associated with monitoring software, detecting error conditions associated with operation of the software, and executing an automated corrective action associated with correcting the error condition, in accordance with embodiments of the present invention.

FIG. 2 illustrates an algorithm detailing a process flow enabled by system 100 of FIG. 1 for improving software technology associated with monitoring software, detecting error conditions associated with operation of the software, and executing an automated corrective action associated with correcting the error condition, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and electronic device 105. In step 200, user interaction patterns of a user are monitored with respect to a software application being executed by an electronic device. The user interaction patterns may be associated with the following actions: input device selections, keystroke entries, an expected data type detected in created virtual files, etc. The software application may be configured to generate and modify virtual columns and headers via virtual keyboard entries.

In step 202, content of the software application is continuously scanned. In step 204, core software usage attributes of the content are analyzed. Additionally, a heat map associated with the user interaction patterns may be generated. In step 208, virtual entry points executed via the user interaction patterns are validated with respect to accessing the software application. Validating the virtual entry points may include identifying virtual data creation patterns of the user based on a historical analysis of previous virtual data creation and editing actions of the user; and identifying data entries associated with the virtual entry points as potentially incorrect virtual data points based on identified data creation patterns of the user interaction patterns and retrieved crowd sourced information.

In step 210, metadata describing the virtual entry points is generated. In step 212, an error condition associated with the user interaction patterns and a current user action implemented with respect to the software application is detected based on analysis of the metadata. Detecting the error condition may include determining that a difference between attributes of the user interaction patterns and attributes of the current user action exceeds a predetermined threshold value.

In step 214, usage area patterns for a specified software application are identified by fetching virtual rules, data variations associated with previously logged data, and associated attributes of the previously logged data. Additionally, contextual situation attributes of the usage area patterns are identified based on a reaction of the user with respect to an error notification. In step 217, an automated corrective action associated with correcting the error condition and maintaining the software application is executed based on results of steps 212 and 214. In step 218, self-learning software code for executing future software application validation processes is generated based on results of said executing the automated corrective action.

Figure 3:
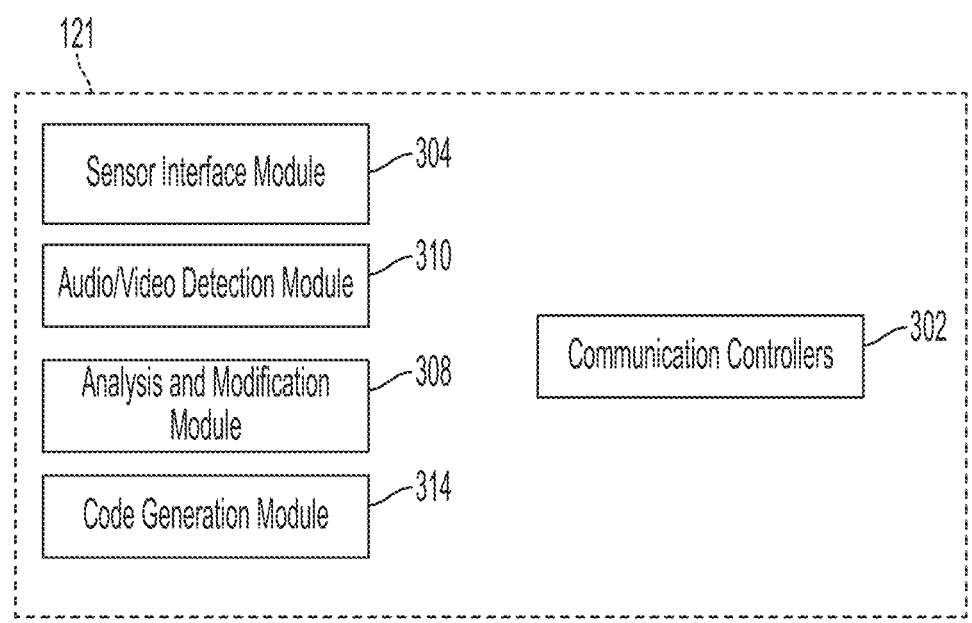
FIG. 3 illustrates an internal structural view of the self-learning software/hardware structure of FIG. 1, in accordance with embodiments of the present invention.

FIG. 3 illustrates an internal structural view of self-learning software/hardware structure 121 and/or self-learning software code/hardware structure 121a of FIG. 1, in accordance with embodiments of the present invention. Self-learning software/hardware structure 121 includes a sensor interface module 304, an audio video control module 310, an analysis and modification module 308, a code generation module 314, and communication controllers 302. Sensor interface module 304 comprises specialized hardware and software for controlling all functions related to sensors 110 of FIG. 1. Audio video control module 310 comprises specialized hardware and software for controlling all functionality related to audio video retrieval device 132 for retrieving video data and implementing the process described with respect to the algorithm of FIG. 2. Analysis and modification module 308 comprises specialized hardware and software for controlling all functions related to the steps of FIG. 2. Code generation module 314 comprises specialized hardware and software for controlling all functions related to generating machine learning feedback for generating self-learning software code for executing future software application validation processes. Communication controllers 302 are enabled for controlling all communications between sensor interface module 304, audio video control module 310, analysis and modification module 308, and code generation module 314.

Figure 4:
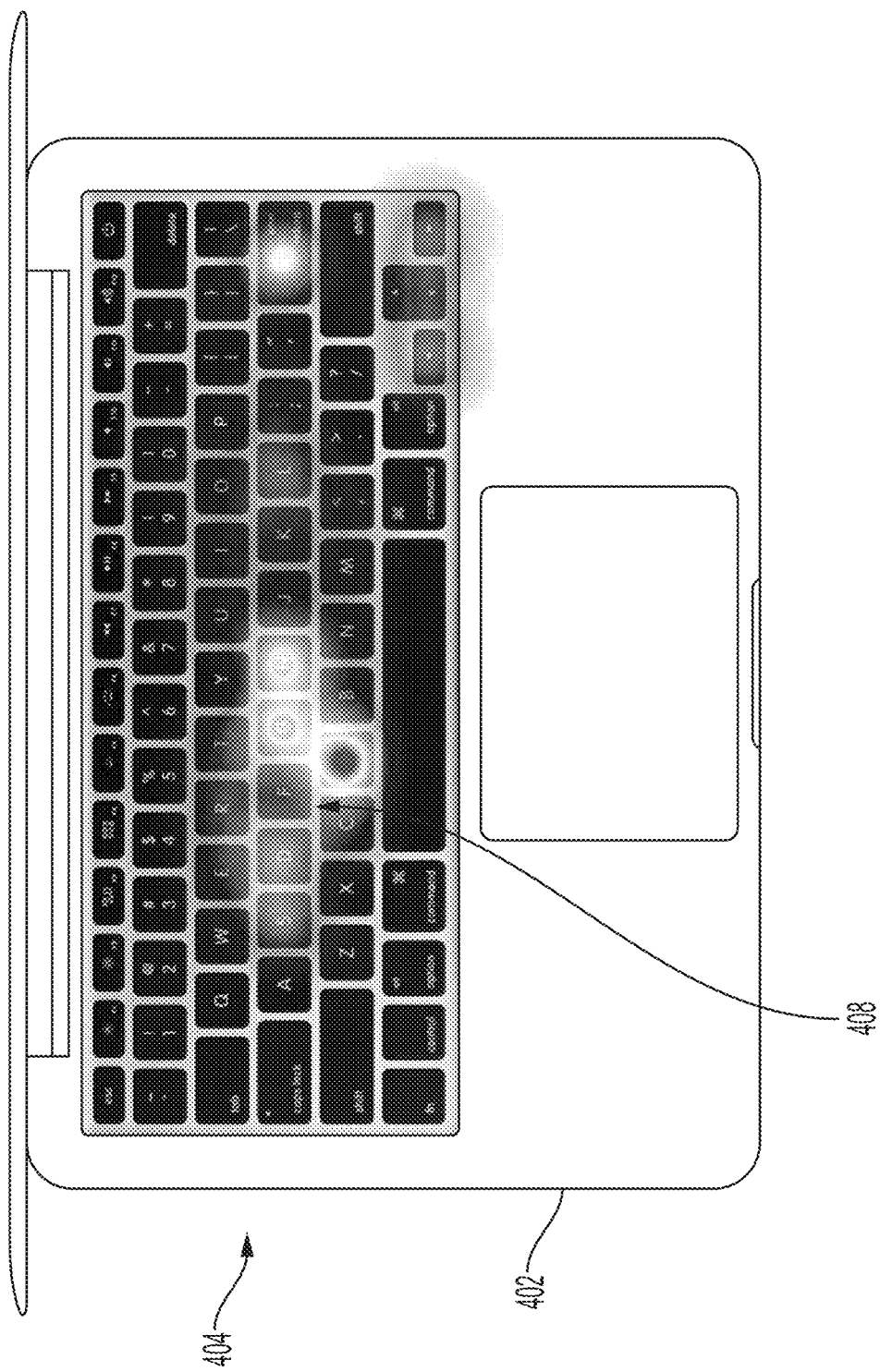
FIG. 4 illustrates the following implementation example associated with a process for improving software technology associated with heat map generation, in accordance with embodiments of the present invention.

FIG. 4 illustrates the following implementation example associated with a process for improving software technology associated with heat map generation, in accordance with embodiments of the present invention. The example illustrated in FIG. 4 illustrates a heat map 408 generated with respect to a keyboard 404 of a device 402. Heat map 408 may be generated based on the user's interaction patterns with keyboard 404 during document or software editing.

Figure 5:
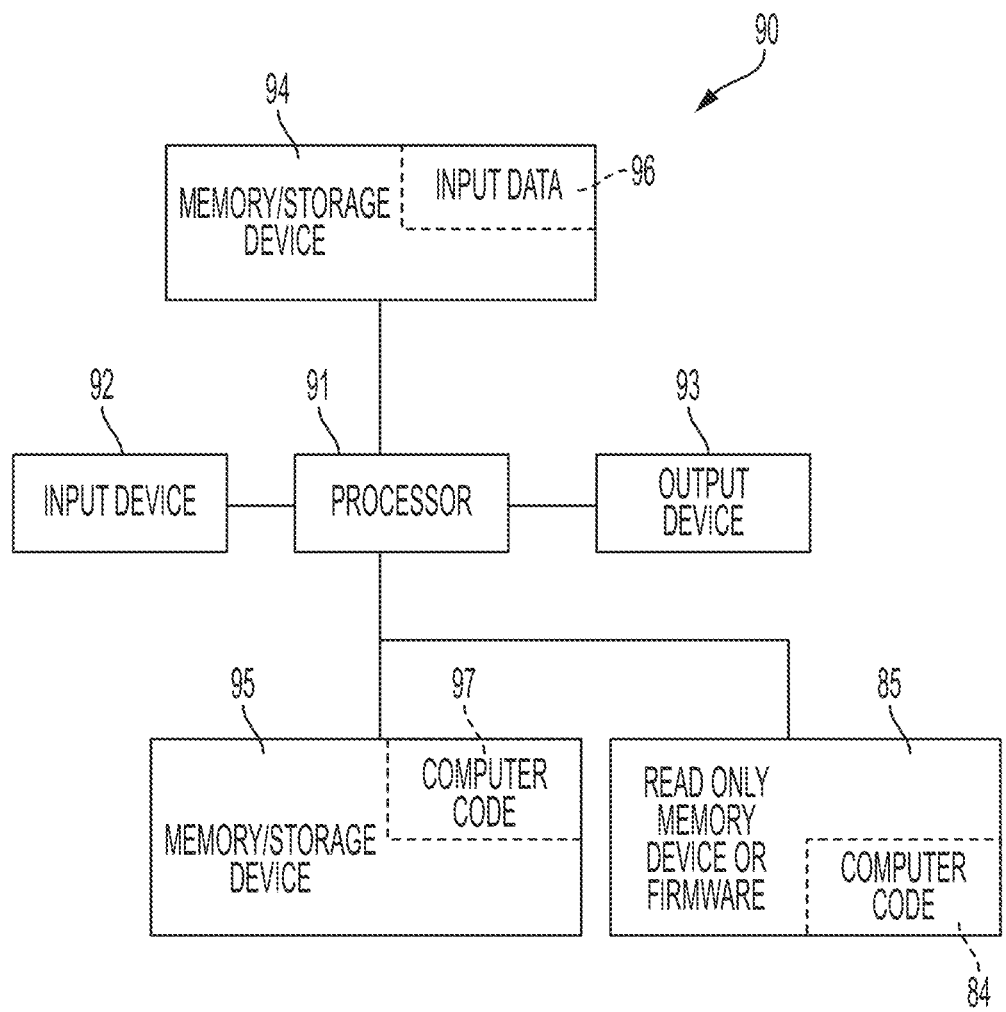
FIG. 5 illustrates a computer system used by the system of FIG. 1 for improving software technology associated with monitoring software, detecting error conditions associated with operation of the software, and executing an automated corrective action associated with correcting the error condition, in accordance with embodiments of the present invention.

FIG. 5 illustrates a computer system 90 (e.g., electronic device 105 and/or server hardware device 104 of FIG. 1) used by or comprised by the system of FIG. 1 for improving software technology associated with monitoring software, detecting error conditions associated with operation of the software, and executing an automated corrective action associated with correcting the error condition, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and memory technology associated with retrieving audible communications, modifying electronic dictionary software, and presenting suggested terms for entering within a specific electronic communication. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with monitoring software, detecting error conditions associated with operation of the software, and executing an automated corrective action associated with correcting the error condition. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with monitoring software, detecting error conditions associated with operation of the software, and executing an automated corrective action associated with correcting the error condition. In another embodiment, the invention provides a business method that performs the process steps of the invention on a subscription, advertising, and/or fee basis. That is, a service supplier, such as a Solution Integrator, could offer to enable a process for improving software technology associated with monitoring software, detecting error conditions associated with operation of the software, and executing an automated corrective action associated with correcting the error condition. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
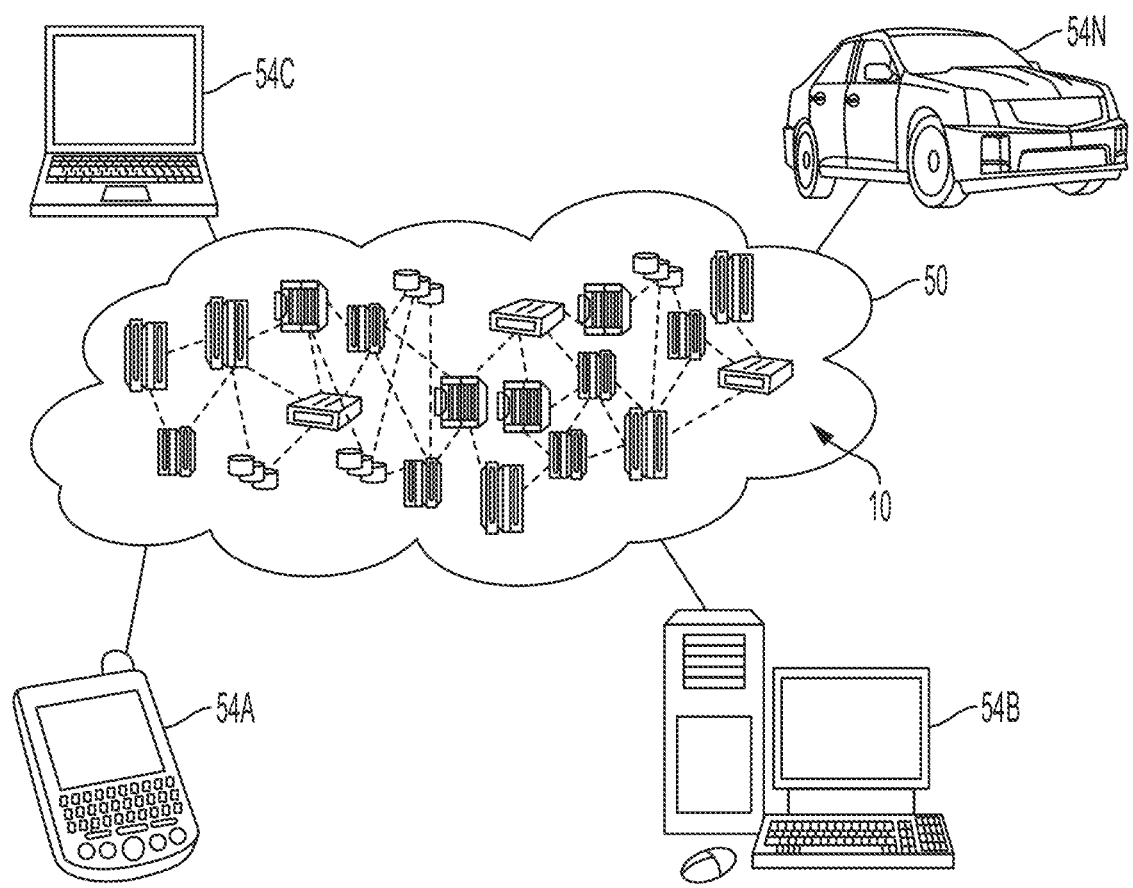
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
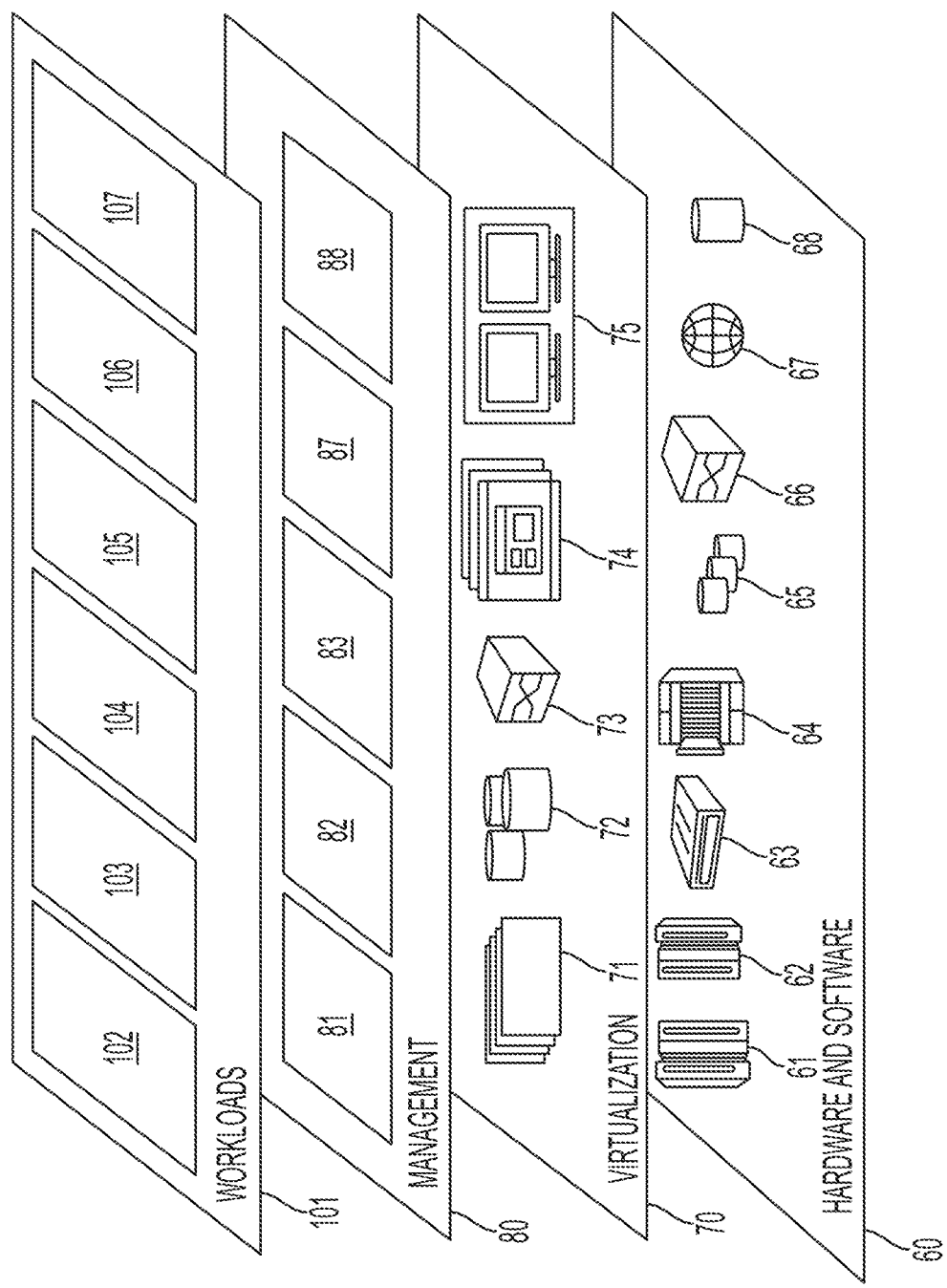
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software technology associated with monitoring software, detecting error conditions associated with operation of the software, and executing an automated corrective action associated with correcting the error condition 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software application validation method comprising:
monitoring, by a processor of an electronic device, user interaction patterns of a user with respect to a software application being executed by said electronic device, wherein said user interaction patterns comprise keyboard implemented data creation patterns of an editor based on historic editing experiences of said editor;
generating, by said processor, a heat map associated with a keyboard associated with said user interaction patterns;
first analyzing, by said processor, a style of said data creation patterns with respect to a personal data editing corpus, of said editor, with respect to pattern identification of said data creation patterns;
filtering from said data creation patterns, by said processor in response to results of said first analyzing, negative data creation patterns with respect to adding numbers to text fields, misclassification of specified data, and pasting incorrect data within an incorrect data type field;
continuously scanning, by said processor, content of said software application;
analyzing, by said processor with respect to results of said filtering, core software usage attributes of said content;
additionally analyzing, by said processor, a correct data type associated with data that should be entered in each field of a document of said software application, wherein said additionally analyzing is executed based on an intended core usage of said document, associated document titles, and associated document table column headers;
validating, by said processor based on said heat map and results of said analyzing and said additionally analyzing, virtual entry points executed via said user interaction patterns with respect to accessing said software application;
generating, by said processor, metadata describing said virtual entry points;
detecting, by said processor based on analyzing said metadata, an error condition associated with said user interaction patterns and a current user action implemented with respect to said software application, wherein said error condition is detected with respect to incorrect data creation rates and associated levels detected during varied intervals of time; and
executing, by said processor, an automated corrective action associated with correcting said error condition and maintaining said software application.

2. The method of claim 1, wherein said user interaction patterns are associated with an action selected from the group consisting of input device selections, keystroke entries, and an expected data type detected in created virtual files.

3. The method of claim 1, wherein said detecting said error condition comprises determining that a difference between attributes of said user interaction patterns and attributes of said current user action exceeds a predetermined threshold value.

4. The method of claim 1, wherein said validating said virtual entry points comprises:
identifying virtual data creation patterns of said user based on a historical analysis of previous virtual data creation and editing actions of said user; and
identifying data entries associated with said virtual entry points as potentially incorrect virtual data points based on identified data creation patterns of said user interaction patterns and retrieved crowd sourced information.

5. The method of claim 1, further comprising:
identifying, by said processor, usage area patterns for a specified software application, wherein said identifying comprises fetching virtual rules, data variations associated with previously logged data, and associated attributes of said previously logged data; and
identifying, by said processor, contextual situation attributes of said usage area patterns based on a reaction of said user with respect to an error notification, wherein said executing said automated corrective action is based on said usage area patterns and said contextual situation attributes.

6. The method of claim 1, further comprising:
generating, by said processor based on results of said executing said automated corrective action, self-learning software code for executing future software application validation processes.

7. The method of claim 1, wherein said software application is configured to generate and modify virtual columns and headers via virtual keyboard entries.

8. The method of claim 1, further comprising:
providing at least one support service for at least one of creating, integrating, hosting, maintaining, and deploying computer-readable code in the control hardware, said code being executed by the computer processor to implement: said monitoring, said continuously scanning, said analyzing, said validating, said generating, said detecting, and said executing.

9. A computer program product, comprising a non-transitory computer readable hardware storage device storing a computer readable program code, said computer readable program code comprising an algorithm that when executed by a processor of an electronic device implements a software application validation method, said method comprising:
monitoring, by said processor, user interaction patterns of a user with respect to a software application being executed by said electronic device, wherein said user interaction patterns comprise keyboard implemented data creation patterns of an editor based on historic editing experiences of said editor;

generating, by said processor, a heat map associated with a keyboard associated with said user interaction patterns;

first analyzing, by said processor, a style of said data creation patterns with respect to a personal data editing corpus, of said editor, with respect to pattern identification of said data creation patterns;

filtering from said data creation patterns, by said processor in response to results of said first analyzing, negative data creation patterns with respect to adding numbers to text fields, misclassification of specified data, and pasting incorrect data within an incorrect data type field;

continuously scanning, by said processor, content of said software application;

analyzing, by said processor with respect to results of said filtering, core software usage attributes of said content;

additionally analyzing, by said processor, a correct data type associated with data that should be entered in each field of a document of said software application, wherein said additionally analyzing is executed based on an intended core usage of said document, associated document titles, and associated document table column headers;

validating, by said processor based on said heat map and results of said analyzing and said additionally analyzing, virtual entry points executed via said user interaction patterns with respect to accessing said software application;

generating, by said processor, metadata describing said virtual entry points;

detecting, by said processor based on analyzing said metadata, an error condition associated with said user interaction patterns and a current user action implemented with respect to said software application, wherein said error condition is detected with respect to incorrect data creation rates and associated levels detected during varied intervals of time; and executing, by said processor, an automated corrective action associated with correcting said error condition and maintaining said software application.

10. The computer program product of claim 9, wherein said user interaction patterns are associated with an action selected from the group consisting of input device selections, keystroke entries, and an expected data type detected in created virtual files.

11. The computer program product of claim 9, wherein said detecting said error condition comprises determining that a difference between attributes of said user interaction patterns and attributes of said current user action exceeds a predetermined threshold value.

12. The computer program product of claim 9, wherein said validating said virtual entry points comprises:

identifying virtual data creation patterns of said user based on a historical analysis of previous virtual data creation and editing actions of said user; and identifying data entries associated with said virtual entry points as potentially incorrect virtual data points based on identified data creation patterns of said user interaction patterns and retrieved crowd sourced information.

13. The computer program product of claim 9, wherein said method further comprises:

identifying, by said processor, usage area patterns for a specified software application, wherein said identifying comprises fetching virtual rules, data variations associated with previously logged data, and associated attributes of said previously logged data; and identifying, by said processor, contextual situation attributes of said usage area patterns based on a reaction of said user with respect to an error notification, wherein said executing said automated corrective action is based on said usage area patterns and said contextual situation attributes.

14. The computer program product of claim 9, wherein said method further comprises:

generating, by said processor based on results of said executing said automated corrective action, self-learning software code for executing future software application validation processes.

15. The computer program product of claim 9, wherein said software application is configured to generate and modify virtual columns and headers via virtual keyboard entries.

16. An electronic device comprising a processor coupled to a computer-readable memory unit, said memory unit comprising instructions that when executed by the processor implements a software application validation method comprising:

monitoring, by said processor, user interaction patterns of a user with respect to a software application being executed by said electronic device, wherein said user interaction patterns comprise keyboard implemented data creation patterns of an editor based on historic editing experiences of said editor;

generating, by said processor, a heat map associated with a keyboard associated with said user interaction patterns;

first analyzing, by said processor, a style of said data creation patterns with respect to a personal data editing corpus, of said editor, with respect to pattern identification of said data creation patterns;

filtering from said data creation patterns, by said processor in response to results of said first analyzing, negative data creation patterns with respect to adding numbers to text fields, misclassification of specified data, and pasting incorrect data within an incorrect data type field;

continuously scanning, by said processor, content of said software application;

analyzing, by said processor with respect to results of said filtering, core software usage attributes of said content;

additionally analyzing, by said processor, a correct data type associated with data that should be entered in each field of a document of said software application, wherein said additionally analyzing is executed based on an intended core usage of said document, associated document titles, and associated document table column headers;

validating, by said processor based on said heat map and results of said analyzing and said additionally analyzing, virtual entry points executed via said user interaction patterns with respect to accessing said software application;

generating, by said processor, metadata describing said virtual entry points;

detecting, by said processor based on analyzing said metadata, an error condition associated with said user interaction patterns and a current user action implemented with respect to said software application, wherein said error condition is detected with respect to incorrect data creation rates and associated levels detected during varied intervals of time; and executing, by said processor, an automated corrective action associated with correcting said error condition and maintaining said software application.

17. The electronic device of claim 16, wherein said user interaction patterns are associated with an action selected from the group consisting of input device selections, keystroke entries, and an expected data type detected in created virtual files.

18. The electronic device of claim 16, wherein said detecting said error condition comprises determining that a difference between attributes of said user interaction patterns and attributes of said current user action exceeds a predetermined threshold value.

* * * * *